US006679048B1

(12) United States Patent
Lee et al.

(10) Patent No.: US 6,679,048 B1
(45) Date of Patent: Jan. 20, 2004

(54) APPARATUS AND METHOD FOR CONTROLLING PRIMARY FLUID FLOW USING SECONDARY FLUID FLOW INJECTION

(75) Inventors: Douglas Lee, Valencia, CA (US); J. Thomas Anderson, Santa Clarita, CA (US); Brian K. Hershberger, Granada Hills, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 30 days.

(21) Appl. No.: 10/323,484

(22) Filed: Dec. 18, 2002

Related U.S. Application Data

(63) Continuation-in-part of application No. 09/695,691, filed on Oct. 24, 2000.

(51) Int. Cl.$^7$ ................................. F02K 1/28

(52) U.S. Cl. ................ 60/204; 60/231; 239/265.23

(58) Field of Search .................. 60/204, 231, 770; 239/265.23

(56) References Cited

U.S. PATENT DOCUMENTS

| | | | | |
|---|---|---|---|---|
| 3,374,954 A | * | 3/1968 | Card | 239/127.1 |
| 3,626,698 A | * | 12/1971 | Baum | 60/768 |
| 3,737,103 A | * | 6/1973 | Howell | 239/265.23 |
| 5,706,650 A | * | 1/1998 | Thayer | 60/231 |
| 6,112,512 A | * | 9/2000 | Miller | 60/204 |
| 6,112,513 A | * | 9/2000 | Catt et al. | 60/204 |

* cited by examiner

*Primary Examiner*—Ehud Gartenberg

(57) ABSTRACT

A device for controlling the direction of flow of a primary fluid includes one or more injectors oriented to inject a secondary fluid against the direction of flow of the primary fluid. The injector is formed by drilling or otherwise forming a hole at an angle to the surface of one or more sidewalls of an engine nozzle or other device. A feedback controller regulates the amount and duration of the secondary fluid injection to achieve the commanded attitude or attitude rate. The controller is coupled to one or more plenums attached to the sidewall(s). The plenums can be arranged to deliver secondary fluid to one or more of the injectors. Secondary fluid delivery to each plenum can be controlled independently to control the flow of the primary fluid in one or more directions. The device can be used to provide thrust vectoring in an aircraft or other type of vehicle, as well as other applications where it is desired to control the direction of a primary fluid.

42 Claims, 4 Drawing Sheets

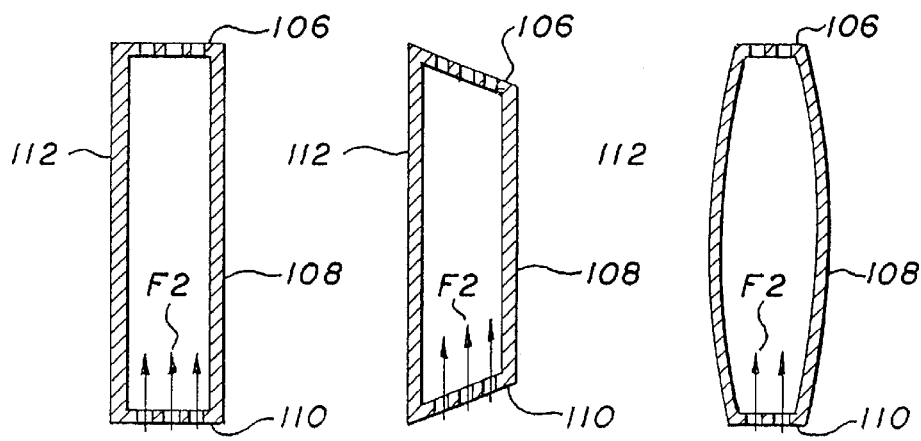
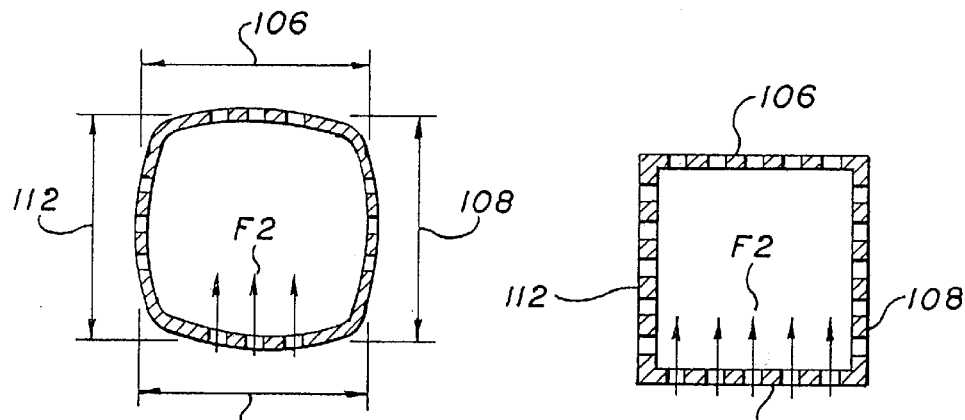
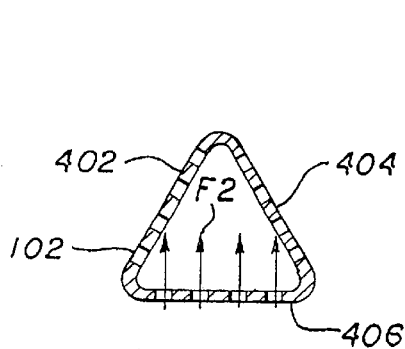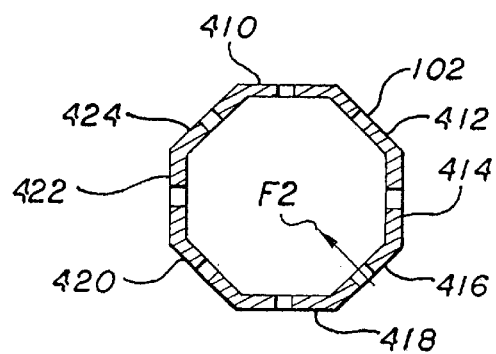

APPARATUS AND METHOD FOR CONTROLLING PRIMARY FLUID FLOW USING SECONDARY FLUID FLOW INJECTION

CROSS-REFERENCE TO RELATED APPLICATIONS

This application is a continuation-in-part of U.S. patent application Ser. No. 09/695,691 entitled "High Aspect Ratio, Fluidic Thrust Vectoring Nozzle", filed Oct. 24, 2000, now abandoned, which is incorporated herein by reference.

TECHNICAL FIELD

The present invention relates to deflecting the flow direction of a primary fluid, and more particularly to apparatus and method whereby a secondary fluid is injected into the primary fluid stream to change the direction of flow of the primary fluid stream.

DESCRIPTION OF THE RELATED ART

Thrust vectored aircraft have many advantages over aircraft using conventional aerodynamic control surfaces. They can lead to tactical advantages in the aircraft's agility and maneuverability and also to improved take-off and landing performance, e.g. on battle-damaged runways or aircraft carriers. Thrust vectored aircraft can also operate outside of the conventional flight envelope, i.e., in the post-stall regime thus giving the pilot a significant advantage leading to improved survivability.

Designing aircraft without tails offers the potential for reduced weight and increased performance, efficiency and stealth. Aircraft such as the X-31 have demonstrated flight without a tail through a supersonic in-flight experiment in which the flight control system reacted as though the aircraft had no tail. The thrust vectoring capability was used to provide necessary aircraft stability, trim and control.

Most of the research in this field has been directed at designing and developing mechanically based systems. Although these systems are effective and may also lead to the removal of conventional moving surfaces and hence to a reduction in drag, they carry many disadvantages. For example, they often involve the use of complex mechanical actuation systems. They are also usually very expensive, difficult to integrate and aerodynamically inefficient. Further, as stealth requirements become ever more important, the radar cross section (RCS) and infra-red radiation (IR) signatures of military aircraft must be minimized.

One alternative to mechanical systems is known as fluidic thrust vectoring, which uses a secondary fluid stream to change the vector angle of a primary exhaust fluid stream from an engine nozzle, thus leading to a change in the overall orientation of the aircraft. Fluidic thrust vectoring involves no external moving parts thus leading to a decrease in radar cross section and infrared signature. Additionally it is lightweight, inexpensive, and easy to implement.

Extensive research of different nozzle shapes and aspect ratios has previously been conducted in connection with future aircraft configurations. Some of the prior innovations focus on the integration and aerodynamic efficiency of the exhaust system. Other innovations focus on mechanical configurations that are intended to effect thrust vectoring. Still other innovations have incorporated fluidic principles with the objectives of generating thrust vectoring power or controlling the effective flow area of a nozzle.

For example, U.S. Pat. No. 5,996,936 to Mueller discloses an exhaust nozzle for a gas turbine engine which includes a converging inlet duct in flow communication with a diverging outlet duct at a throat therebetween. Compressed air from the engine is selectively injected through a slot at the throat for fluidically varying flow area at the throat.

U.S. Pat. No. 6,112,512 to Miller et al. discloses an apparatus and method for varying the effective cross sectional area of an opening through a fixed geometry nozzle to provide a fluidic cross flow with an injector incorporated in the throat of the nozzle proximate to the subsonic portion of the flow through the nozzle. One or more injectors are directed at an angle in opposition to the subsonic portion of the flow. The opposed cross flow from the injectors interacts with a primary flow through the nozzle to partially block the nozzle's opening, thereby effectively decreasing the cross sectional area of the nozzle throat. A plurality of cross flows proximate to a nozzle's throat permits effective afterburner operations even with a fixed geometry nozzle by allowing throttling of the primary flow. Further, variations in the cross flow's mass flow characteristics or injection angle can allow vectoring of the primary flow.

U.S. Pat. No. 4,018,384 to Fitzgerald et al. teaches deflection of only a portion of the fluid thrust emanating from a nozzle, but the deflection takes place as a result of mechanical devices rather than another fluid stream. U.S. Pat. No. 4,686,824 to Dunaway et al. discloses apparatus for modulating the thrust vector of a rocket motor by injecting gas into the divergent section of the rocket nozzle and modulating injection of the hot gas by varying the flow from a solid propellant gas generator by controlling its flow rate with a vortex throttling valve arrangement. And U.S. Pat. No. 5,694,766 to Smereczniak et al. discloses a method and apparatus for controlling the throat area, expansion ratio and thrust vector of an aircraft turbine engine exhaust nozzle, using means, such as deflectors and/or injected air, for producing and controlling regions of locally separated flow, as well as control of the thrust vector angle defined by the gas exiting the nozzle to provide increased directional control of the aircraft.

The nozzle shapes studied in the patents mentioned above tend to be circular or of low aspect ratio. Fluidic injection from the top, bottom, and sidewall surfaces of nozzles and combinations of the three have also been analyzed, but have failed to produce the high levels of thrust vectoring and aerodynamic performance thought to be needed for quick maneuverability and efficient performance. Until recently, the amount of thrust vector angle generated with fluidics has not been high, typically less than eight degrees, and therefore, thrust vectoring through fluidics alone has only been found to be applicable to a very limited range of vehicle designs. Moreover, the efficiency of prior nozzle designs which used fluid injection or secondary flow to generate thrust vectoring has been quite low, typically on the order of 1.6 degrees of vector angle or less per each percent of secondary flow $F_2$ extracted from the primary flow $F_1$ at a primary nozzle pressure equal to 4 times the free-stream static pressure (Nozzle Pressure Ratio (NPR)). Thus, since it typically is not desirable to extract more than 10 percent of the primary flow to provide secondary flow, peak thrust vector angles have been low while inefficiently utilizing high secondary flow rates in nozzle shapes that are limited in their applicability to advanced designs and requirements.

It is therefore desirable to provide increased fluidic thrust vectoring capability to enhance vehicle maneuverability, as well as decrease radar and infrared cross section, and minimize requirements for additional moving parts, thereby improving reliability while reducing weight, cost, and complexity.

SUMMARY

Against this background of known technology, an apparatus to develop relatively high thrust vectoring power and efficiency in a broad range of configurations is provided. Some embodiments of such an apparatus include a nozzle with one or more injectors that introduce a secondary fluid against the direction of flow of a primary thrust fluid, thereby providing an apparatus with high thrust vectoring capability that can be easily integrated into a wide variety of vehicle configurations. The thrust vectoring nozzle can exert forces in one or more directions simultaneously to maneuver and control the vehicle about one or more axes of movement including pitch, roll and/or yaw.

In one embodiment, the injector(s) are formed in the sidewalls of the nozzle by drilling or otherwise forming a hole at an angle relative to the surface of the sidewall. A plenum is attached to one side of the nozzle sidewall to deliver the secondary fluid to the injector(s). Any number, size, and configuration of injectors can be disposed in each sidewall to provide the desired amount of maneuvering control. In general, the injectors can be disposed at any position, but are typically positioned as close to the exit area of the primary flow as possible.

A controller can be included to regulate the amount and duration of secondary flow delivered. The controller can be coupled to regulate the secondary flow to one or more plenums simultaneously. An operator or an autonomous control system can provide attitude or attitude rate commands, which are translated to secondary flow injections by the controller. Attitude and attitude rate feedback can be provided to the controller to allow the controller to refine the amount of secondary flow injected over time.

A variety of nozzle shapes and sizes can be configured to accommodate the injectors in their sidewalls, including high aspect ratio nozzles capable of generating thrust vectoring capability beyond that available in the prior art.

The secondary fluid can be provided by extracting some of the primary fluid, or by providing an independent source of secondary fluid.

While various configurations of the nozzles can be utilized in air vehicles, it is expected that embodiments of a device for altering the direction of flow of a primary fluid using secondary fluid injection can be utilized in other types of vehicles as well. The primary and secondary fluids can be in gaseous, solid particle, or liquid form. Other advantages and features of the invention will become more apparent, as will equivalent structures which are intended to be covered herein, with the teaching of the principles of embodiments of the present invention as disclosed in the following description, claims, and drawings.

BRIEF DESCRIPTION OF THE DRAWINGS

A more complete understanding of the present invention and advantages thereof may be acquired by referring to the following description taken in conjunction with the accompanying drawings in which like reference numbers indicate like features and wherein:

FIGS. 4A through 4G depict end views of some examples of nozzle configurations in which secondary fluid injection can be utilized to provide thrust vectoring.

DETAILED DESCRIPTION

Figure 1A:
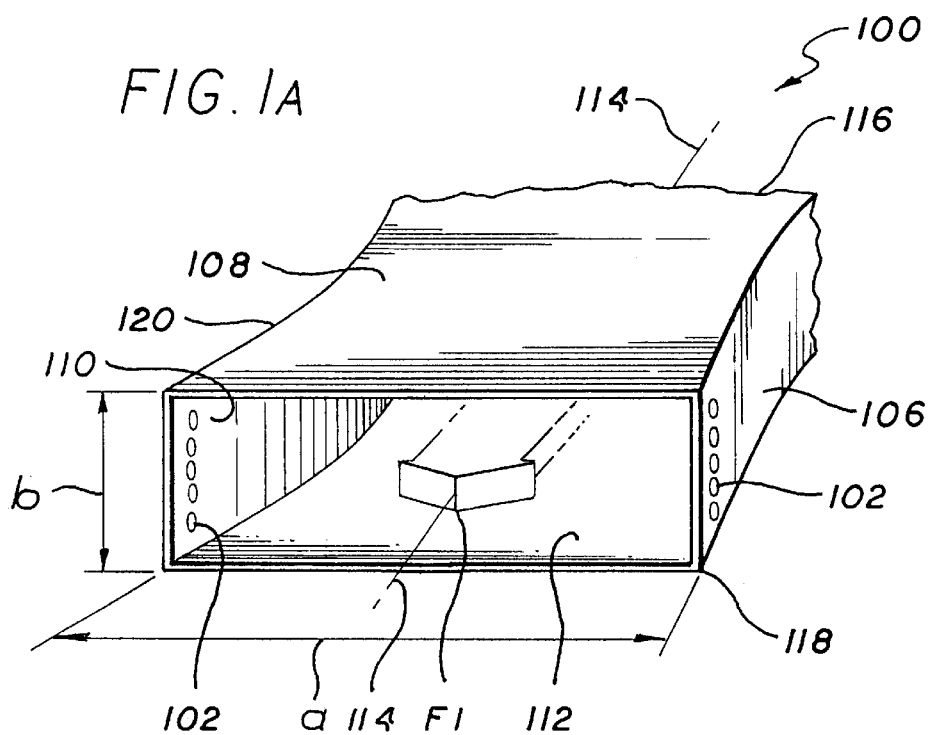
FIG. 1A is a perspective view of an embodiment of a thrust vectoring nozzle.
Figure 1B:
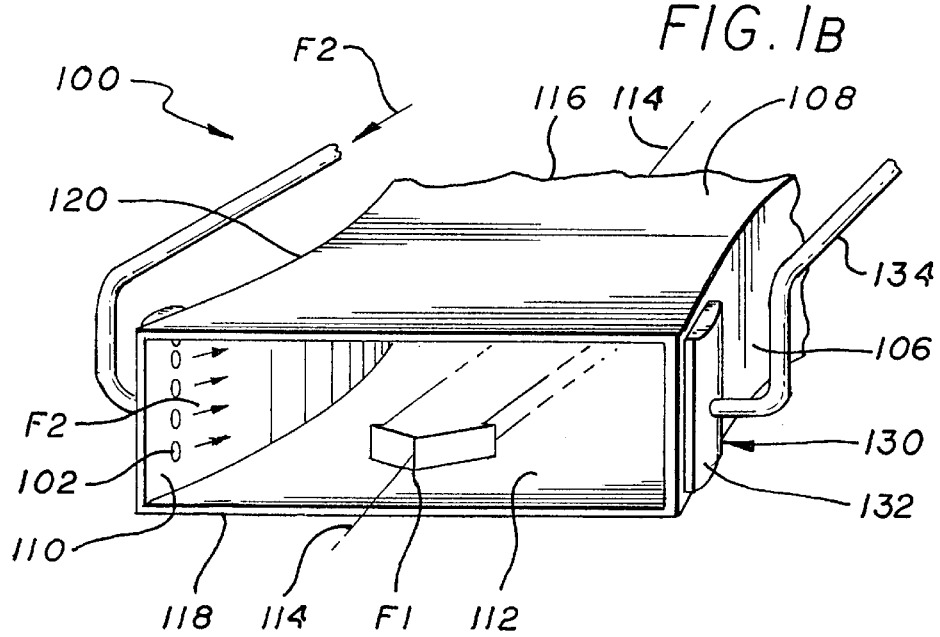
FIG. 1B is a perspective view of the nozzle of FIG. 1A including a plenum for supplying secondary fluid flow attached to the nozzle.

Referring now to FIGS. 1A and 1B, an embodiment of nozzle 100 is shown including thrust vectoring features that enhance vehicle maneuverability without requiring complex moving parts or increasing radar or infrared signatures. One or more injectors 102 are provided, such as by drilling holes in one or more of the sidewalls of nozzle 100. Injectors 102 are oriented to inject a secondary fluid flow $F_2$ at an angle opposing the direction of the primary fluid flow $F_1$. The force of the injected secondary fluid flow $F_2$ on the primary fluid flow $F_1$ changes the direction of the exhaust thrust vector. Nozzle 100 accordingly provides a reliable, low cost, highly effective thrust vectoring solution that can be easily implemented with minimal additional weight as further described herein.

Sidewalls 106 to 112 of nozzle 100 enclose a cavity centered about thrust axis 114. A convergent inlet area 116 forms the upstream end of nozzle 100, and a divergent exit area 118 forms the downstream end of nozzle 100. During operation, primary fluid flow $F_1$ enters inlet area 116 and is exhausted through exit area 118. Nozzle 100 also includes a throat area 120 positioned between inlet area 116 and exit area 118. Throat area 120 is the point or section in nozzle 100 having the smallest cross sectional area. In some embodiments, exit area 118 is a two-dimensional nozzle configuration in which the sidewalls 106 to 112 form a substantially rectangular shape. The term aspect ratio as used herein refers to the ratio of the length a of sidewall 108 or 112 to the length b of sidewall 106 or 110. The thrust-vectoring control moments are proportional to the thrust vector deflection angle and the force exerted by the vectored primary fluid flow $F_1$. As the aspect ratio of exit area 118 increases, the force of the injected secondary fluid flow $F_2$ influences primary flow $F_1$ more efficiently, thus increasing the thrust vector deflection angle per unit secondary flow. The aspect ratio, along with other design variables, can therefore be selected to achieve desired thrust vectoring moments. Secondary fluid flow $F_2$ can be injected continuously. Alternatively, secondary fluid flow $F_2$ can be injected at regular or irregular pulsed intervals.

Injectors 102 are formed in at least one of sidewalls 106 to 112 through which secondary fluid flow $F_2$ can be injected into the divergent exhaust area 118. Thrust-vectoring can generate pitch, roll, and yaw control moments by deflecting the primary flow $F_1$ vertically and horizontally. For single nozzle configurations, vertical deflections cause pitching moments, and horizontal deflections cause yawing moments. Multiple nozzles 100 can be positioned at desired locations relative to the axes of the vehicle so that vertical deflections cause pitching moments, differential vertical deflections cause rolling moments, and horizontal deflections cause yawing moments. In some embodiments, injector(s) 102 are disposed on opposing sidewalls 106 and 110. In other embodiments, one or more injectors 102 can be formed in only one of sidewalls 106 or 110. Injectors 102 can be arranged in rows having the same or a different number of injectors 102 in each row. Groups of injectors 102 can be arranged in sidewalls 106 to 112 to meet the requirements for a particular use.

While injectors 102 can be positioned at various locations on sidewalls 106, 108, 110, and/or 112, the greatest amount of thrust vectoring is typically achieved by positioning injectors 102 as close to the free stream edge of exit area 118 as possible. The force exerted by secondary fluid flow $F_2$ is also dependent on the diameter of injectors 102 and the pressure of secondary fluid flow $F_2$. Injectors 102 with larger diameters and lower pressure can achieve the same overall fluid mass flow as smaller diameters with higher pressure secondary fluid flow $F_2$. Any combination of number, size, and location of injectors 102, and rate of secondary fluid flow $F_2$, can be configured to provide the desired thrust vectoring capability.

FIG. 1B is a perspective view of nozzle 100 including plenum 130 for supplying secondary fluid flow $F_2$ to injectors 102. Plenum 130 includes a compartment or chamber 132 to which one or more air ducts 134 are connected to form part of the distribution system for secondary fluid flow $F_2$. Plenum 130 can be attached to sidewall 106 using any suitable method or mechanism, such as welding, mechanical fastener(s) or structure, and bonding. A gasket (not shown) or other device can be included between sidewall 106 and plenum 130 to provide an airtight seal. Plenum 130 can be configured to supply secondary fluid flow $F_2$ to one or more injectors 102 on one or more sidewalls 106, 108, 110, and/or 112. Alternatively, two or more plenums 130 can be included to supply secondary fluid flow $F_2$ to different subsets of a group of injectors 102 on a single sidewall 106, 108, 110, 112. Such a configuration could be used to supply secondary fluid flow $F_2$ at the same or at different pressures to different injectors 102. In some configurations, subsets of injectors 102 having the same or different diameters can receive secondary fluid flow $F_2$ from different plenums 130 to provide flexibility in supplying secondary fluid flow $F_2$ required to achieve the desired thrust vectoring forces.

Figure 2:
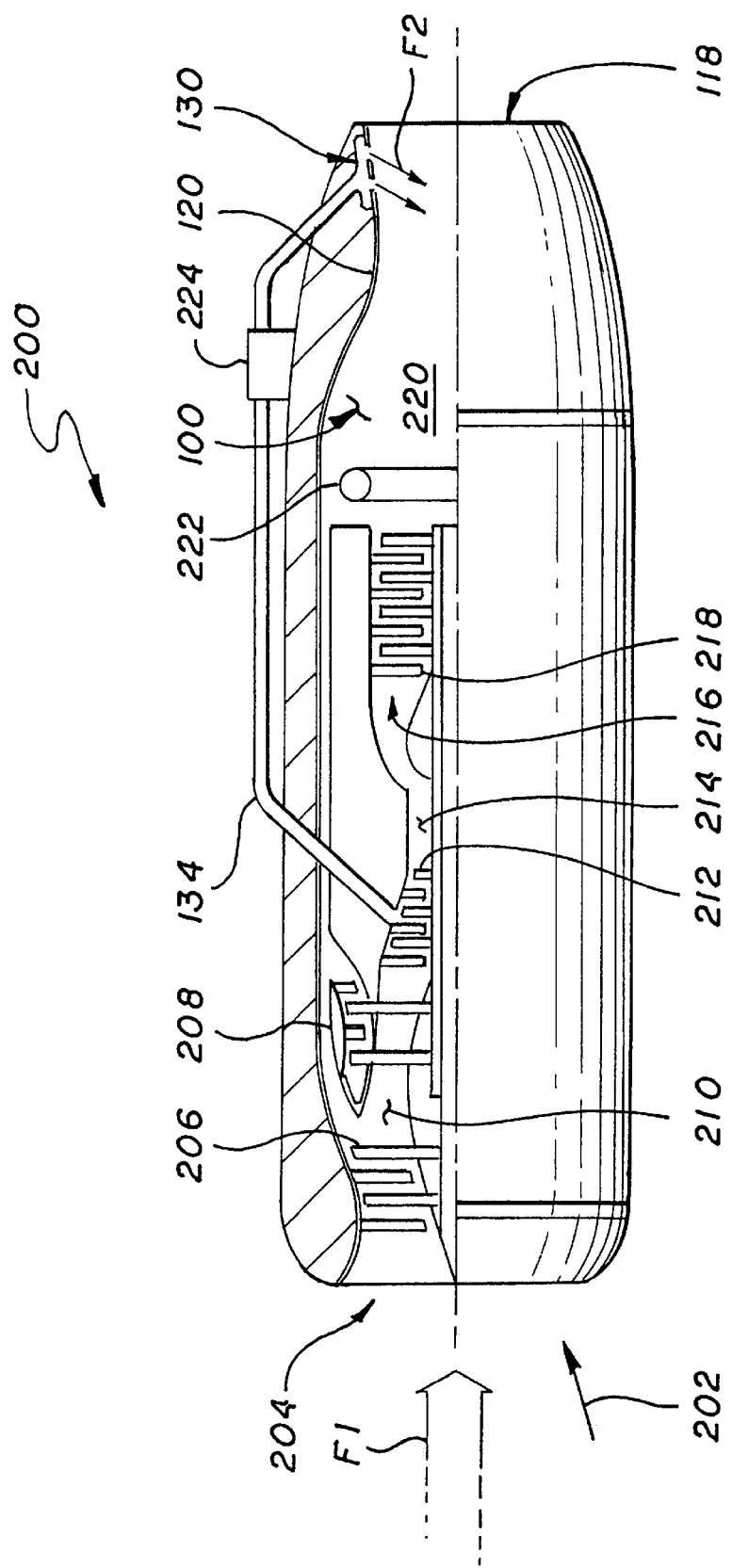
FIG. 2 depicts a side sectional view of an embodiment of a thrust vectoring engine.

FIG. 2 depicts a side cross-sectional view of an embodiment of jet engine 200 equipped with nozzle 100 and plenum 130. In general, secondary fluid flow $F_2$ can be generated by extracting off a controlled amount of primary fluid flow $F_1$, however it is usually desirable to extract as little of primary fluid flow $F_1$ as possible to preserve forward thrust. The amount of secondary fluid flow $F_2$ utilized in a particular situation can be selected based on the amount of forward thrust versus the amount of thrust vectoring capability desired.

Primary fluid flow $F_1$ of air enters jet engine 200 through intake 202. Fan section 204, comprised of a plurality of rotating fan blades 206, pushes flow $F_1$ into bypass section 208 and compressor section 210. Compressor section 210 is comprised of a plurality of compressor blades 212 which compress flow $F_1$ into combustion chamber 214. Fuel is mixed with flow $F_1$ in combustion chamber 214 and ignited, thereby adding energy to flow $F_1$, resulting in an increased pressure and temperature of flow $F_1$ in combustion chamber 214. Pressure within combustion chamber 214 forces flow $F_1$ into turbine section 216, which is comprised of a plurality of turbine blades 218. Turbine section 216 removes some energy from flow $F_1$ to power compressor section 210 and fan section 204. Flow $F_1$ then passes into exhaust chamber 220 where it combines with the flow from bypass section 208. An afterburner 222 can provide additional fuel that is ignited increase the energy of flow $F_1$. Flow $F_1$ is then expelled from engine 200 through exit area 118 as an exhaust flow.

Air duct 134 collects high pressure air from flow $F_1$ at compressor section 210 to provide secondary fluid flow $F_2$ to injectors 102. In alternative embodiments, air duct 134 can collect air from bypass section 208, combustion chamber 214 or any other portion of engine 200 having high pressure air. In some embodiments, a separate compressor can provide high pressure air to air duct 134. A controller 224 controls a valve (not shown) operationally coupled to air duct 134 to regulate secondary fluid flow $F_2$ to injectors 102. One or more air ducts 134 can provide secondary fluid flow $F_2$ to one or more injectors 102.

In operation, controller 224 can vary the amount of secondary fluid flow $F_2$ injected into nozzle 100 to achieve the desired amount of thrust vectoring. For example, pitch, roll, yaw, and airspeed commands can be provided to controller 224 to determine the amount of primary flow $F_1$ to divert to provide thrust vectoring. Gradual changes in pitch, roll, and yaw attitude typically will require less secondary fluid flow $F_2$ than rapid changes. Controller 224 can direct an appropriate amount of secondary fluid flow $F_2$ to achieve the commanded rate of change of pitch, roll, or yaw attitude. In one embodiment, a mechanical valve can provide a mechanism for controlling the amount of secondary fluid flow $F_2$ injected into nozzle 100. In another embodiment, each injector 102 or group of injectors 102 can be controlled by its own associated controller 224. Controller 224 can include processing hardware, firmware, and/or software with instructions for controlling engine operational parameters and thrust vectoring. In other embodiments, the function of controlling engine 200 and thrust vectoring via injection of secondary fluid flow $F_2$ can be accomplished with separate controllers.

Figure 3A:
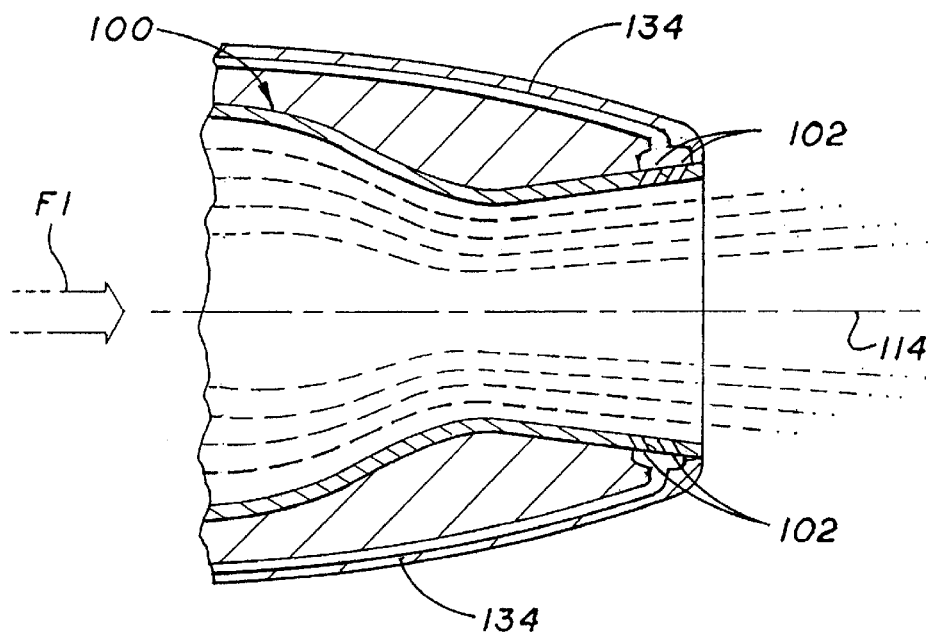
FIG. 3A depicts an embodiment of a nozzle showing an exhaust stream of unvectored primary fluid flow.
Figure 3B:
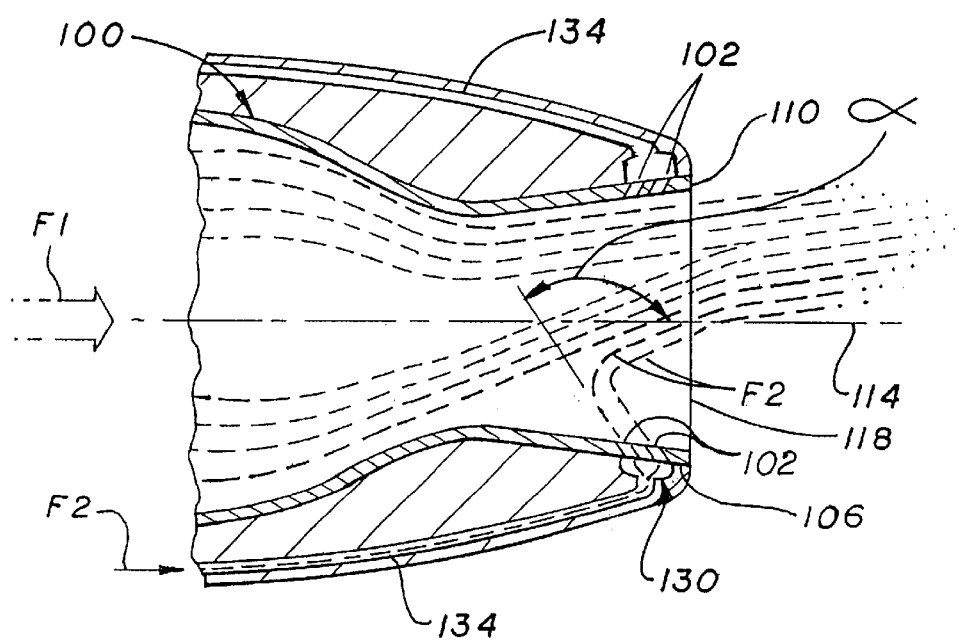
FIG. 3B depicts an embodiment of the nozzle of FIG. 3A showing a secondary fluid flow injected in the exhaust stream of the primary fluid to effect thrust vectoring.

Referring now to FIGS. 3A and 3B, FIG. 3A depicts a cross-sectional side view of an embodiment of nozzle 100 that includes two injectors 102. As shown, no secondary fluid flow $F_2$ is being supplied through injectors 102 via air duct 134. The only fluid within nozzle 100 is primary fluid flow $F_1$ passing through throat 120 of nozzle 100 toward the downstream end thereof, and the thrust field is substantially uniform and directed along thrust 114 of nozzle 100. Accordingly, the exhaust stream of primary fluid flow $F_1$ is substantially symmetric about thrust axis 114.

FIG. 3B depicts a side view of nozzle 100 of FIG. 3A showing secondary fluid flow $F_2$ injected into the exhaust stream through injectors 102 in a direction opposite to the direction of primary fluid flow $F_1$. The force exerted by secondary fluid flow $F_2$ on primary fluid flow $F_1$ skews primary fluid flow $F_1$ away from side wall 106. It should be clear, therefore, that by rendering injectors 102 operative, primary fluid flow $F_1$ is deflected at an angle to axis 114, thereby creating a pitch, roll, or yaw moment about the center of gravity of the vehicle in which nozzle 100 is incorporated to influence the direction of the vehicle. It should also be obvious that the strength of, or power behind, the injected secondary fluid flow $F_2$ can also influence the deflection of primary fluid flow $F_1$.

In general, the larger the angle at which secondary fluid flow 102 is injected against the direction of primary fluid flow $F_1$, the greater the deflection of primary fluid flow $F_1$ with respect to thrust axis 114. Thus, higher thrust vectoring forces are generated by increasing the angle a at which injectors 102 are oriented with respect to the surface of sidewall 106, 110. Sidewalls 106, 108, 110, and/or 112 can include any number of rows of injectors 102, and any number of injectors per row. One consideration, however, is the amount of secondary fluid flow $F_2$ required to achieve the desired amount of thrust vectoring. In some configurations, a greater number of holes will diffuse the force per area of a given amount of secondary fluid flow $F_2$ on primary fluid flow $F_1$. Additionally, injectors 102 positioned closer to exit area 118 typically generate more effective thrust vectoring force compared to injectors 102 positioned further upstream. In some embodiments, an auxiliary source of secondary fluid flow $F_2$, such as a tank of compressed fluid (not shown), can be coupled to plenum 130 and controller 224 (FIG. 2) to augment secondary fluid flow $F_2$ from engine 200 (FIG. 2).

Referring to FIGS. 3B, and 4A to 4G, FIGS. 4A through 4G depict cross-sectional views of some examples of nozzle 100 adjacent exit area 118 in which secondary fluid injection can be utilized to provide thrust vectoring. FIGS. 4A through 4C show injectors 102 disposed in opposing side wall portions 106 and 110 to provide forces in two directions, however injectors 102 can also be disposed in side wall portions 108 and 112, as shown in FIGS. 4D and 4E, to provide thrust vectoring forces in four directions.

The configurations shown in FIGS. 4A to 4C are typically integrated in a vehicle to provide either nose up/nose down thrust vectoring or nose left/nose right thrust vectoring. The configurations shown in FIGS. 4D and 4E can be used to provide nose up, nose down, nose left, and nose right thrust vectoring capability. Further, secondary flow $F_2$ can be injected in adjacent sidewalls in the configurations shown in FIGS. 4D and 4E to cause simultaneous thrust vectoring forces in two directions, such as nose up/nose left, nose up/nose right, nose down/nose left, and nose down/nose right.

The configurations shown in FIGS. 4F and 4G show examples of configurations having three sidewalls 402, 404, 406, and eight sidewalls 410, 412, 414, 416, 418, 420, 422, 424, respectively. Note that injectors 102 can be provided in any number of sidewalls to provide maneuvering control in the desired directions. Further, secondary flow $F_2$ can be injected simultaneously in two or more sidewalls to effect maneuvering control in two or more directions. It should also be noted that the position of one or more of nozzle 100 on a vehicle can be selected with respect to the vehicle's center of gravity to increase or decrease the pitch, roll, and yaw moments that can be achieved with a given amount of thrust vectoring force.

In the configurations shown in FIGS. 4A to 4C, exit area 118 has a high aspect ratio, e.g. greater than 2, compared to configurations shown in FIGS. 4D and 4G. For given amounts of primary fluid flow $F_1$ and secondary fluid flow $F_2$, and length of sidewalls 108 and/or 112, the configurations shown in FIGS. 4A to 4C will exhibit greater deflection of primary fluid flow $F_1$, when the injection occurs thru the shorter sidewall, than the configurations shown in FIGS. 4D through 4G. This is due to the fact that the same amount of secondary fluid flow $F_2$ is more concentrated in the shorter length of sidewall 106 or 110, thus producing more deflection of the primary flow $F_1$ near the wall. This effect is then propagated across the duct along sidewalls 108 and 112, thus deflecting the entire primary flow $F_1$.

A variety of configurations other than those shown in FIGS. 1A through 4G can be utilized in various embodiments of nozzle 100. Parameters that can be selected to achieve a desired amount of thrust vectoring include the angle at which secondary fluid flow $F_2$ is injected against the direction of primary fluid flow $F_1$, the aspect ratio of exit area 118, the amount of secondary fluid flow $F_2$ injected into primary fluid flow $F_1$, the number of injectors 102, the size of the injectors 102 and the position of injectors 102 relative to exit area 118.

Experimental tests were conducted using a configuration of nozzle 100 having an aspect ratio of 4.5 at the nozzle exit 118, with a secondary flow area of combined injectors 102 to throat area 120 ratio of 0.015. The holes were oriented in sidewall 106 to inject secondary fluid flow $F_2$ at an angle of 125 degrees with respect to the direction of primary fluid flow $F_1$ and located at approximately 90% of the length from throat 120 to exit area 118. Injectors 102 in sidewall 106 had a cylindrical shape with a length to diameter ratio over 2. The test configuration nozzle 100 exhibited peak thrust vector angles of up to approximately twenty-two (22) degrees utilizing 6 percent of primary fluid flow $F_1$ to supply secondary fluid flow $F_2$ at a low NPR of 1.3. Twelve and one-half (12.5) degrees of vectoring were achieved at NPR 4 with 5 percent of $F_2/F_1$. Superior fluidic thrust vectoring capability of 2.5 degrees of thrust vector angle per percent of primary fluid flow $F_1$ utilized for thrust vectoring was achieved for NPR 4 and 3.6 degrees per percent $F_1$ at NPR 1.3. In contrast, known prior art devices are only capable of deflecting primary fluid flow $F_1$ approximately 1.6 degrees for every one percent of primary fluid flow $F_1$ utilized to supply secondary fluid flow $F_2$ for NPR 4.

Embodiments of nozzle 100 can be incorporated in a variety of devices where thrust vectoring can be utilized including devices that operate on the ground and/or in the air. Additionally, other embodiments of an apparatus for deflecting the flow of a primary fluid by injecting a secondary fluid against the direction of the primary fluid can be provided for uses in addition to thrust vectoring in vehicles. Applications can include devices in the medical, agricultural, entertainment, and transportation industries, for example. The primary and secondary fluids can be in gaseous, solid particle, or liquid form.

Those skilled in the art will appreciate that various adoptions and modifications of the invention as described above can be configured without departing from the scope and spirit of the invention. Therefore, it is to be understood that, within the scope of the appended claims, the invention may be practiced other than as specifically described herein.

What we claim is:

1. An apparatus for altering the direction of an exhaust stream produced by an aircraft engine, comprising:
    an upstream end portion, a downstream end portion, and a throat area between the upstream end portion and the downstream end portion;
    at least one pair of opposing side wall portions at the downstream end portion;
    an exit area in the downstream end portion at an end opposite the end adjoining the throat area, wherein the exhaust stream exits the apparatus at the exit area;
    at least one injector positioned on one of the side wall portions adjacent the exit area, the at least one injector being oriented to inject a secondary fluid flow into the exhaust stream in a direction opposing the direction of flow of the exhaust stream; and
    the aspect ratio at the exit area is approximately 4.5 and the ratio of the total area of the at least one injector to throat area is approximately 0.015.

2. The apparatus of claim 1, wherein the upstream end portion is convergent toward the throat area.

3. The apparatus of claim 1, wherein the opposing side wall portions at the downstream end portion diverge downstream from the throat area.

4. The apparatus of claim 3, wherein the at least one injector is positioned on one of the divergent side wall portions.

5. The apparatus of claim 4, wherein the side wall portions form a rectangular cross-section at the downstream end.

6. The apparatus of claim 4, wherein the side wall portions form a polygonal cross-section at the downstream end.

7. The apparatus of claim 4, comprising four side wall portions, wherein two opposing side wall portions are substantially parallel to one another.

8. The apparatus of claim 7, wherein the other two opposing side wall portions form an arcuate cross section.

9. The apparatus of claim 1, wherein at least one injector is positioned in each side wall portion.

10. The apparatus of claim 9, comprising at least two injectors, wherein the at least two injectors are operable independently of one another.

11. The apparatus of claim 1, wherein the at least one injector is positioned adjacent the exit area at approximately 90% of the length from the throat area to the exit area.

12. The apparatus of claim 1, wherein the at least one injector is disposed in the side wall portion by forming a hole having an oblique cylindrical shape in the side wall portion.

13. The apparatus of claim 11, wherein the at least one injector is oriented in one of the side wall portions to inject secondary flow at an angle of approximately 125 degrees with respect to the direction of the primary fluid flow.

14. An engine with thrust vectoring capability comprising:
a throat portion;
an exit portion;
side wall portions extending from the throat portion to the exit portion, wherein a stream of primary fluid enters the throat portion and is exhausted through the exit portion during operation;
at least one injector disposed in at least one of the side wall portions to inject a secondary fluid into die stream of the primary fluid, wherein the at least one injector is positioned proximate the exit portion and oriented to inject the secondary fluid in a direction opposing the direction of flow of the primary fluid; and
the aspect ratio of the sidewall portions at the exit portion is approximately 4.5 and the ratio of the total area of the at least one injector to the throat portion is approximately 0.015.

15. The engine of claim 14, further comprising:
a plenum coupled to supply the secondary fluid to the at least one injector.

16. The engine of claim 14, further comprising:
a duct coupled between an upstream area of the engine and the at least one injector, wherein the secondary fluid is supplied from a portion of the primary fluid stream.

17. The engine of claim 14, wherein a pair of the side wall portions diverge from one another between the inlet portion and the exit portion.

18. The engine of claim 14, wherein a pair of the side wall portions are situated on opposing sides of the nozzle, each side wall including a plurality of injectors, wherein the injectors are selectively operable to inject the secondary fluid into the stream of the primary fluid.

19. The engine of claim 14, further comprising:
a duct coupled to supply the secondary fluid to the at least one injector; and
a controller coupled to the duct to regulate the amount of the secondary fluid that is injected into the primary fluid stream.

20. The engine of claim 14, wherein at least two side walls include at least one injector.

21. The engine of claim 20, wherein the injectors are operable simultaneously and independently of one another.

22. The engine of claim 14, wherein the at least one injector is disposed in the side wall portion by forming a hole in the side wall portion.

23. The engine of claim 22, wherein the hole is oriented at an angle toward the inlet portion with respect to the surface of the side wall portion.

24. The engine of claim 20, wherein the injector is positioned adjacent the exit portion at approximately 90% of the length from the throat portioni to the exit portion.

25. A vehicle comprising:
an exhaust area through which a stream of primary fluid exits the vehicle;
at least one injector disposed proximate the exhaust area to inject a secondary fluid into the stream of the primary fluid proximate the exhaust area, wherein the at least one injector is oriented to inject the secondary fluid at an angle greater than 90 degrees with respect to the direction of flow of the primary fluid; and
the aspect ratio of sidewall portions at the exhaust area is approximately 4.5 and the ratio of the total area of the at least one injector to throat area is approximately 0.015.

26. The vehicle of claim 25, further comprising:
a duct coupled to extract a portion of the primary fluid to supply the secondary fluid.

27. The vehicle of claim 25, wherein the at least one injector is disposed adjacent the exhaust area at approximately 90% of the length from a throat portion to the exhaust area.

28. The vehicle of claim 27, wherein at least two of the side wall portions each include at least one injector, wherein the injectors are selectively operable to inject the secondary fluid into the stream of the primary fluid.

29. The vehicle of claim 25, further comprising:
a duct coupled to supply the secondary fluid to the at least one injector; and
a controller coupled to the duct to regulate the amount of the secondary fluid that is injected into the primary fluid stream.

30. The vehicle of claim 25, wherein the at least one injector is disposed in the vehicle by forming a hole in a portion of the vehicle proximate the exhaust area.

31. The vehicle of claim 25, wherein the at least one injector is oriented to inject the secondary fluid in lateral and opposing directions with respect to the direction of flow of the primary fluid.

32. The velicle of claim 25, further comprising another injector, wherein the injectors are operable independently.

33. The vehicle of claim 25, further comprising a source of secondary fluid that is provided independently from the primary fluid.

34. A method for maneuvering a vehicle, wherein the vehicle includes an exhaust area through which a primary fluid exits the vehicle, the method comprising:
injecting a secondary fluid proximate the exhaust area at an angle greater than 90 degrees with respect to the direction of flow of the primary fluid, wherein the aspect ratio of sidewall portions at the exhaust area is approximately 4.5 or more, and a substantial portion of the injection area is disposed adjacent the exhaust area at approximately 90% or more of the length from a throat portion to the exhaust area.

35. The method as set forth in claim 34 further comprising:
injecting the secondary fluid at multiple locations proximate the exhaust area.

36. The method as set forth in claim 35 wherein the secondary fluid can be injected selectively in at least one of the multiple locations.

37. A device for controlling the direction of flow of a primary fluid, comprising:

at least one injector, wherein the at least one injector is oriented to inject a secondary fluid into the primary fluid in a direction opposing the direction of flow of the primary fluid, wherein the primary fluid is exhausted through an exit area, and a substantial portion of the injection area of the at least one injector is disposed adjacent the exhaust area at approximately 90% or more of the length from a throat portion to the exit area; and the aspect ratio of sidewall portions at the exit area is approximately 4.5 or more.

38. The device as set forth in claim 37, further comprising:

controller coupled to a source of the secondary fluid, wherein the controller is operable to regulate the amount and duration of the injection of the secondary fluid.

39. The device as set forth in claim 38, wherein the injector is disposed in a portion of the device by forming a hole having a cylindrical shape, the device further comprising:

a plenum covering one side of the hole, wherein the secondary fluid is delivered to the plenum and injected into the primary flow through the at least one injector.

40. The device as set forth in claim 39, further comprising:

a plurality of injectors; and a plurality of plenums, wherein each plenum provides the secondary fluid to at least one of the injectors.

41. The device as set forth in claim 40, wherein the controller is operable to regulate the amount and duration of the injection of the secondary fluid to each plenum independently.

42. The device as set forth in claim 41, wherein the controller is operable to supply the secondary fluid to at least two of the plurality of injectors simultaneously.

\* \* \* \* \*